Figure 1:
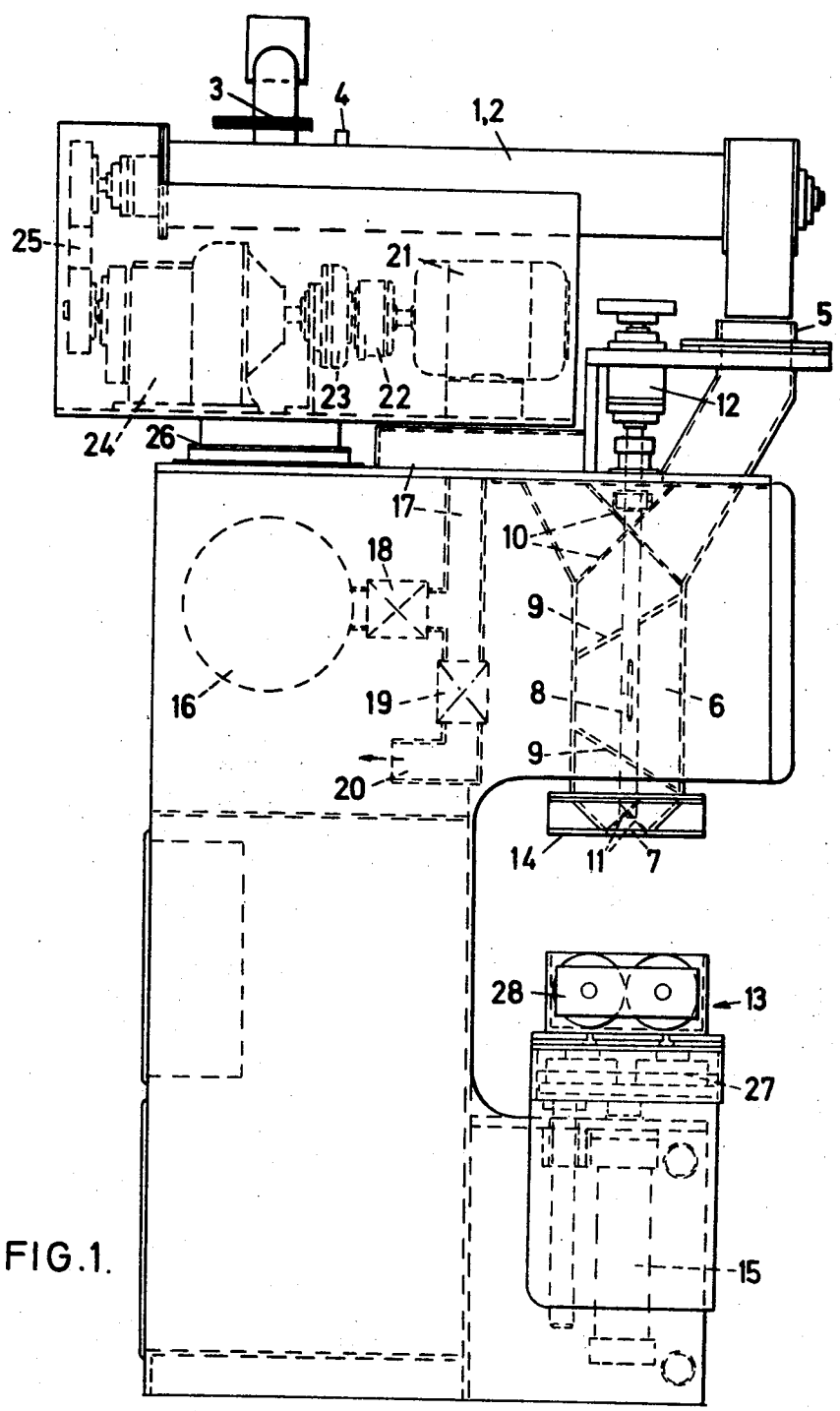

United States Patent

Edwards

[15] 3,704,743
[45] Dec. 5, 1972

[54] METHOD AND APPARATUS FOR MANUFACTURE OF COLD SETTING FOUNDRY MOULDS AND CORES

[72] Inventor: Albert Edwards, Peterborough, England

[73] Assignee: Baker Perkins Limited, Peterborough, England

[22] Filed: July 13, 1970

[21] Appl. No.: 54,227

[30] Foreign Application Priority Data

July 21, 1969 Great Britain.....................36,548/69

[52] U.S. Cl. ....................164/21, 164/157, 164/200, 259/8
[51] Int. Cl. ............................................B22c 15/24
[58] Field of Search..............164/21, 43, 200, 37, 22; 259/7, 8, 107

[56] References Cited

UNITED STATES PATENTS

| | | |
|---|---|---|
| 1,345,542 | 7/1920 | Hartshorn ...........................259/107 |
| 2,847,196 | 8/1958 | Franklin et al. ..........................259/8 |
| 3,439,733 | 4/1969 | Miller et al ..........................164/21 X |
| 3,472,307 | 10/1969 | Godding.............................164/43 X |
| 3,590,906 | 7/1971 | Bayliss et al........................164/200 |

OTHER PUBLICATIONS

Modern Casting; July, 1968; page 124.

*Primary Examiner*—Robert D. Baldwin
*Attorney*—Larson, Taylor & Hinds

[57] ABSTRACT

A method and means for making foundry moulds or cores from a cold setting sand/resin/catalyst mixture in which separate metered charges of sand and resin and sand and catalyst are supplied to a mixing chamber in which operates a rotary mixing element and when sufficient quantities of each charge have been supplied to the chamber for the core or mould being produced the resultant mixture is expelled from the chamber into a core or mould box by applying a blast of compressed air to the chamber.

12 Claims, 2 Drawing Figures

INVENTOR
ALBERT EDWARDS

METHOD AND APPARATUS FOR MANUFACTURE OF COLD SETTING FOUNDRY MOULDS AND CORES

It has been proposed for the production of foundry moulds and cores to utilize a cold quick-setting sand/resin/catalyst mixture. Due to the nature of the mixture constituents, rapid chemical reactions take place when they are brought together and a problem has accordingly arisen in preparing moulds and cores therefrom.

According to the present invention, a sand/resin mixture and a sand/catalyst mixture are supplied to a mixing chamber in which they are intermixed by a rotating mechanical mixing element, and when sufficient quantities of each mixture have been supplied to the chamber for a mould or core being prepared, the resultant admixture is shot from the chamber into a mould or core box by applying a blast of compressed gas (conveniently compressed air) to the chamber.

Further, according to the present invention, a sand/resin mixture and a sand/catalyst mixture are supplied to a mixing chamber in which they are intermixed by a continuously rotating mechanical mixing element, and when sufficient quantities of each mixture have been supplied to the chamber for a mould or core being prepared, the resultant admixture is shot from the chamber directly into a mould or core box through an outlet at the base of the chamber by applying a blast of compressed gas (conveniently compressed air) to the chamber.

The invention further provides apparatus for preparing foundry moulds or cores comprising a mixing chamber, a rotatable mixing element in the chamber, supply means for delivering a sand/resin mixture and a sand/catalyst mixture to the chamber, drive means for rotating the mixing element to intermix the mixtures as and when these are supplied to the chamber, and mixture expelling means for supplying a blast of compressed gas to the chamber when metered quantities of the mixtures have been supplied thereto to shoot the resultant admixture into a core or mould box through an outlet of the chamber.

The invention also provides apparatus for preparing foundry moulds or cores comprising a mixing chamber having an outlet at its base, a rotatable mixing element in the chamber, supply means for delivering a sand/resin mixture and a sand/catalyst mixture to the chamber, drive means for continuously rotating the mixing element to intermix the mixtures as and when these are supplied to the chamber, and mixture expelling means for supplying a blast of compressed gas to the chamber when metered quantities of the mixtures have been supplied thereto to shoot the resultant admixture into a core or mould box through said outlet.

In one form of the invention, the mixing element has a vertical shaft with scimitar shaped mixer blades having vertical scraper members at their outer extremities which extend the full depth of the chamber and we have found that with this type of element a rotational speed of about 60 – 100 R.P.M. is suitable.

The supply means may conveniently comprise a pair of combined mixer-conveyor units each having a sand inlet, a resin or catalyst inlet, and an internal mixer conveyor element in the form of a screw or a bladed shaft of the type described in British Pat. No. 1,051,651 which mixes the constituents as they are conveyed to an outlet discharging into the mixing chamber.

Figure 2:
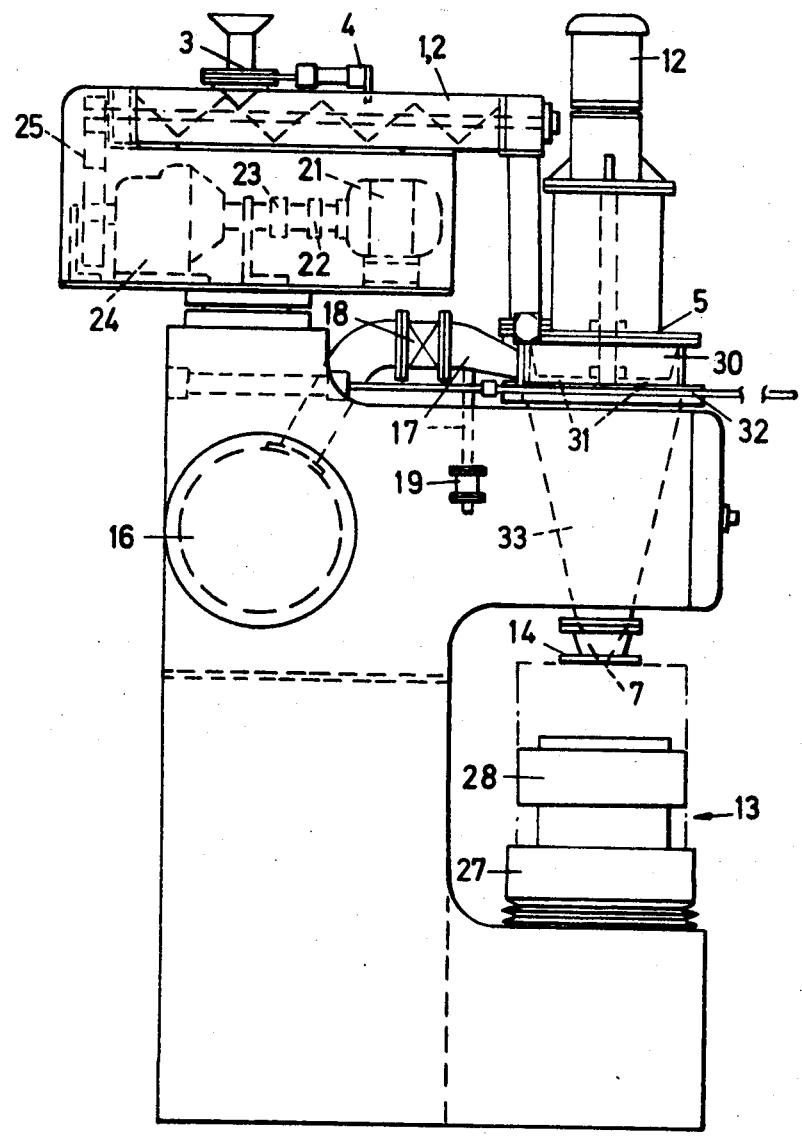

The invention will now be described by way of an example with reference to the accompanying drawings in which FIG. 1 is a semi-diagrammatic side view of one form of apparatus for making foundry moulds and cores, and FIG. 2 is a semi-diagrammatic side view of another form of apparatus for the same purpose.

Referring to FIG. 1, a pair of elevated combined mixer conveyor units 1 and 2 having internal mixer conveyor elements (not shown) gate valve controlled sand feeds 3, and resin or catalyst inlets 4, discharge through gate valve controlled outlets 5 into a mixing chamber 6, having an outlet 7 in its base, and a vertical shaft mixing element 8 with inclined radial mixing rods 9 and scraper blades 10 and 11, a motor 12 being provided for rotating the mixing element 8 at about 200 – 250 R.P.M. Below the outlet 7 is vertically adjustable mounting arrangement 13 for a mould or core box, including vertically operable diaphragm clamps 27 and horizontally operable diaphragm clamps 28 and outlet 7 is surrounded by a plate 14 with vent holes formed therein which plate, in use, covers a mould or core box which is lifted into contact with the plate by the vertically operable diaphragm clamps 27 and an adjusting cylinder 15 is provided to set the mounting arrangement 13 in position for a particular batch of core or mould boxes.

A compressed air reservoir 16 is connected with the mixing chamber 6 by a duct 17 including a control valve 18 and an exhaust branch 20 with a valve 19 leading from duct 17.

Drive means for the mixer conveyor units including a motor 21, clutch 22, brake 23, gearbox 24 and chain drivers 25, is mounted on a rotary base 26 so that the entire mixer conveyor and drive structure can be swivelled. A control circuit and timer means are provided so that the apparatus functions as follows:

Initially the gate valve controller mixer conveyor unit outlets 5 are opened and sand and catalyst and sand and resin are supplied to the respective units at controlled rates of flow with the conveyor drives operating. The mixtures are thus supplied to the chamber 6 where they are intermixed by element 8 and during this phase of operation only an insignificant quantity of mixture escapes through the outlet 7 due to a bridging effect of the admixture. When a required amount of both the sand/resin and sand/catalyst mixtures have been supplied to the mixing chamber for a mould or core being formed, a timer terminates the supply of sand, resin, and catalyst to the mixer-conveyor units and stops their conveyor-mixer elements which causes the gate valves controlling the flow of mixtures into the mixing chamber to close.

Then while the mixing element 8 continues to rotate, a further timer closes valve 19 and opens the valve 18, thus subjecting the moulding mixture charge in chamber 6 to a blast of compressed air which shoots the mixture into the core or mould box which is vented through the holes in plate 14. Valve 18 remains open for a period sufficient to discharge the reservoir 16 and is then closed and valve 19 is simultaneously opened to vent the core or mould box and chamber 6 to the atmosphere.

The diaphragm clamps are opened, the box removed and replaced by a fresh one and the cycle repeated.

The arrangement shown in FIG. 2 is similar to that shown in FIG. 1, and like references have been used to refer to like parts. In this case, however, the mixing chamber 30 is relatively shallow and incorporates a rotatable mixing element having scimitar shaped mixer blades 31, the extremities of which extend vertically the height of the chamber. The chamber outlet is controlled by a gate valve 32 and below the chamber is a frusto-conical chute 33 terminating in an outlet 7 and plate 14 like those in the first embodiment.

Operation is similar to the FIG. 1 arrangement except that the gate valve 32 is closed while the separate mixtures are supplied to chamber 31 through outlet 5 and then when sufficient mixture quantities have been supplied, outlets 5 are closed, gate valve 31 is opened and the pneumatic system is operated in like manner to the FIG. 1 system so that the admixture from chamber 1 is shot into the mould or core box through chute 33. In this arrangement the mixer element is rotated, during mixing, at a speed of about 60 – 100 R.P.M.

What I claim is:

1. Apparatus for preparing foundry moulds and cores from a cold quick setting sand, resin and catalyst mixture comprising a stationary mixing chamber having a pair of inlets for the delivery thereto of two separate charges, one charge being sand and resin and the other charge being sand and catalyst, said chamber further having an outlet and means for connecting said outlet directly to a moulding box for delivery of the mixture from the chamber to the mould box without additional operations on the mixture between said outlet and the mould box, supply means for delivering said separate charges of said sand and resin and said sand and catalyst to said chamber, controlled valve means between the supply means and the chamber for sealing the supply of said charges to the chamber from said supply means when metered quantities of said charges have been delivered, a rotatable mixing element in the chamber, drive means for continuously rotating the mixing element while the two charges are being introduced and while the mixture is being removed to form a substantially complete mixture from said charges as said charges are supplied to the chamber, a source of compressed gas, duct means connecting said source to the chamber and a controlled valve means in said duct means for admitting a blast of compressed gas from said source to said chamber when said metered quantities of said charges have been supplied to the chamber to shoot the mixture directly into a moulding box through said outlet without additional operations on the mixture between the said outlet and the moulded box.

2. Apparatus as claimed in claim 1, wherein said mixing element has a vertical shaft with scimitar shaped mixer blades having vertical scraper members at their outer extremities extending substantially the full depth of the chamber.

3. Apparatus as claimed in claim 1, wherein said outlet is permanently open.

4. Apparatus as claimed in claim 1, wherein said outlet is controlled by a sliding gate valve.

5. Apparatus as claimed in claim 1, wherein said supply means comprises a pair of combined mixer conveyor units each having a sand inlet, a further inlet for binder and catalyst respectively and an internal mixer conveyor element for mixing the constituents as they are conveyed to an outlet for discharging the mixture into the mixing chamber.

6. Apparatus as claimed in claim 5, wherein each mixer conveyor unit outlet has a sliding gate valve for sealing the chamber therefrom.

7. Apparatus as claimed in claim 1, wherein the mixing chamber is adapted to shoot the resultant mixture into a moulding box via a hollow member.

8. Apparatus as claimed in claim 1, wherein a valve controlled exhaust branch leads from said duct means.

9. Apparatus as claimed in claim 1, including a timer to control opening and closing of said valve means.

10. A method of preparing foundry moulds and cores by a substantially cold curing process comprising the steps of: metering separately a first charge of sand and resin and a second charge of sand and catalyst, delivering the separate charges separately into a stationary mixing chamber, substantially completely mixing the two charges in the mixing chamber with a continuously operating rotating mixing element, and when said metered charges have been supplied to the mixing chamber removing the mixture from the mixing chamber directly into a mould or core box without the interposition of additional operating steps on the mixture between the chamber and the mould box, by directing a blast of compressed gas, introduced through a passage separate from the charge inlet into the mixture in the chamber such that its energy is utilized primarily to move the mixture out of an outlet from the mixing chamber and directly into the mould or core box, the step of mixing the two charges with the mixing element continuing as the charges are introduced into and as the mixture is removed from the mixing chamber to effect said substantially complete mixing of the charges in the chamber.

11. A method according to claim 10, wherein valves control the openings of charge inlets into the mixing chamber and of the compressed gas into the mixing chamber, and including the step of coordinating the timing of operation of these valves.

12. A method according to claim 10, wherein the first and second charges enter the mixing chamber at one end, the mixture is discharged at the other end, and wherein the blast of compressed gas is directed in a direction from the said one end towards the other end.

* * * * *